United States Patent
Li (10) Patent No.: US 9,660,954 B2
(45) Date of Patent: May 23, 2017

(54) VOIP ROUTING BASED ON RTP SERVER-TO-SERVER ROUTING

(71) Applicant: Algoblu Holdings Limited, Grand Cayman (KY)

(72) Inventor: Ming Li, Beijing (CN)

(73) Assignee: Algoblu Holdings Limited, Grand Cayman (KY)

( * ) Notice: Subject to any disclaimer, the term of this patent is extended or adjusted under 35 U.S.C. 154(b) by 95 days.

(21) Appl. No.: 14/639,719

(22) Filed: Mar. 5, 2015

(65) Prior Publication Data

US 2016/0261554 A1    Sep. 8, 2016

(30) Foreign Application Priority Data

Mar. 5, 2015   (CN) .......................... 2015 1 0096384

(51) Int. Cl.
| | |
|---|---|
| *H04L 29/12* | (2006.01) |
| *H04L 29/06* | (2006.01) |
| *H04L 12/28* | (2006.01) |
| *H04M 7/00* | (2006.01) |

(52) U.S. Cl.
CPC ...... *H04L 61/1529* (2013.01); *H04L 12/2854* (2013.01); *H04L 65/10* (2013.01); *H04L 65/608* (2013.01); *H04M 7/006* (2013.01)

(58) Field of Classification Search
None
See application file for complete search history.

(56) References Cited

U.S. PATENT DOCUMENTS

| | | | |
|---|---|---|---|
| 8,638,696 B1 * | 1/2014 | Sojka | H04L 65/403 370/260 |
| 2004/0120294 A1 * | 6/2004 | Yang | H04L 29/12311 370/338 |
| 2008/0181216 A1 * | 7/2008 | Breau | H04L 12/66 370/389 |
| 2014/0153566 A1 * | 6/2014 | Fahlgren | H04L 65/1006 370/352 |
| 2014/0362730 A1 * | 12/2014 | Zhang | H04L 45/64 370/254 |

* cited by examiner

*Primary Examiner* — Charles C Jiang
*Assistant Examiner* — Saad Khawar (57) ABSTRACT

A system and method of providing VoIP services by using multiple Real-time Transport Protocol servers (RTP) servers for transmitting VoIP data between user endpoints. The RTP servers are selected based on the network addresses of the respective endpoints according to the network topology. Traffic mirroring is established among the selected RTP servers. Each RTP server is responsible for transmitting the VoIP data representing the video/audio signals received at its associated endpoint to another RTP server which then relays the VoIP data to another endpoint. Further, routing optimization can be performed to select a network route between the selected RTP servers for RTP data transmission.

17 Claims, 6 Drawing Sheets

VOIP ROUTING BASED ON RTP SERVER-TO-SERVER ROUTING

CROSS REFERENCE

This application claims priority to and benefit of Chinese Patent Application No. 201510096384.6, filed on Mar. 5, 2015, in the State Intellectual Property Office (SIPO), the entire content of which is incorporated by reference herein for all purposes.

TECHNICAL FIELD

The present disclosure relates generally to the field of network communications, and, more specifically, to the field of Voice over Internet Protocol (VoIP) communications.

BACKGROUND

Voice over Internet Protocol (VoIP) is the technology of using digital signal transmission techniques to transmit voice communications in real-time and at least partially over the Internet. VoIP enables an audio or video call over Internet Protocol (IP) networks as a cost-effective alternative of voice transmission that exclusively uses traditional public switched telephone networks (PSTNs) by long distance exchange carriers. Due to the digital nature of the transmission, VoIP provides increased signal processing, encryption and call set-up and operating capabilities.

Typically, VoIP messages are transmitted using the Real-time Transport Protocol (RTP), the RTP Control Protocol (RTCP), and the Session Initiation Protocol (SIP). Accordingly, a VoIP system includes RTP server(s) and SIP server(s). The RTP defines a standardized packet format and carries the media streams (e.g., audio and video data), while the RTCP is used to monitor transmission statistics and Quality of Service (QoS) and aid synchronization of multiple streams. The Session Initiation Protocol (SIP) assists in setting up and ending connections of various system components across the network.

Figure 1:
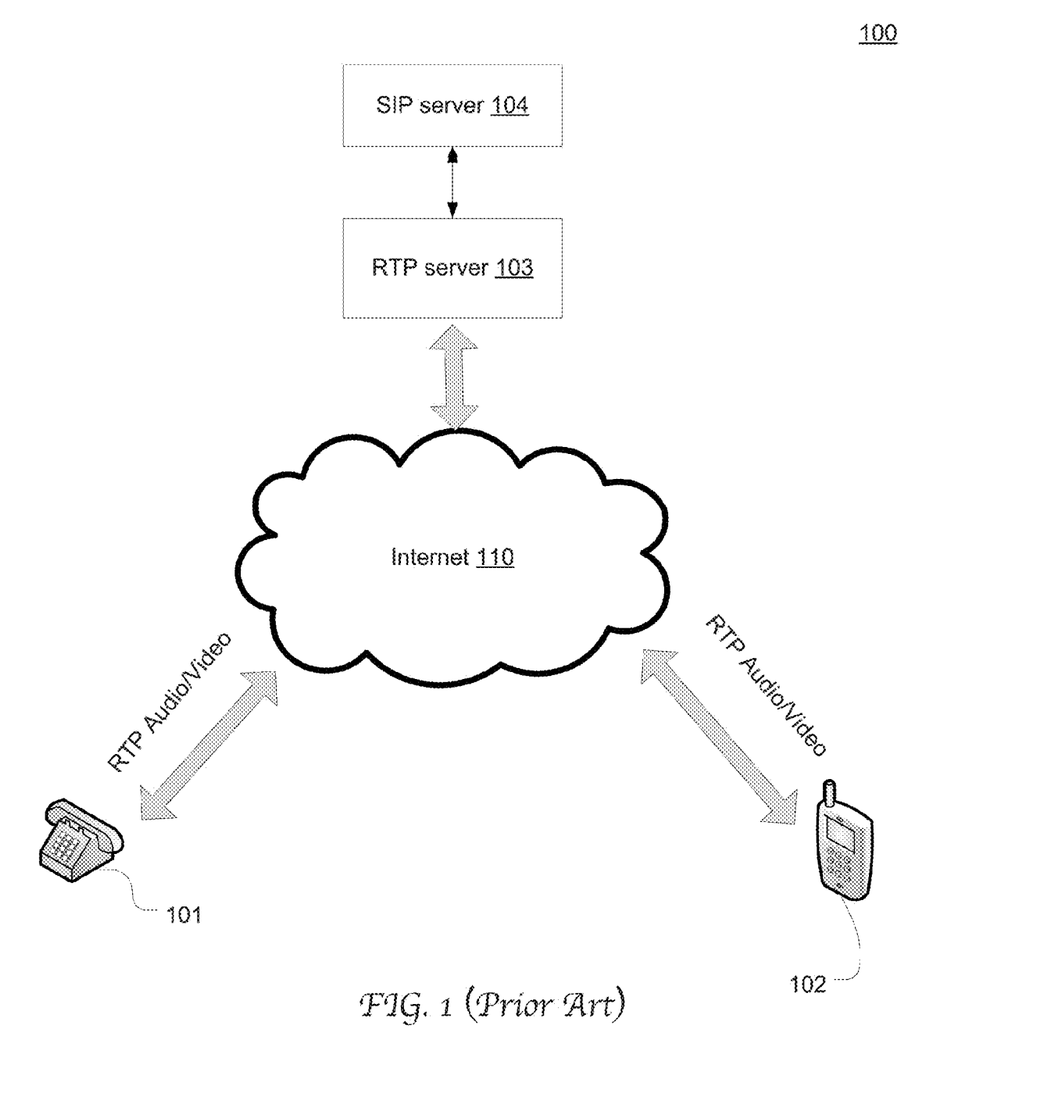
FIG. 1 illustrates a VoIP system according to the prior art.

FIG. 1 illustrates a VoIP system 100 according to the prior art. The system 100 includes user endpoints 101 and 102, the RTP server 103, the SIP server 104, which are all coupled to the Internet 110. For instance, the user endpoints include a wired phone 101 (or a consumer premises equipment (CPE)) as the caller device and a mobile phone 102 as the receiver device (or callee device). Once a VoIP call request is generated at the caller device 101 and sent to the SIP server 104, the SIP server 104 selects an RTP server (the RTP server 103 in this example) and signals the selected RTP server 103 to start routing the call between user endpoints over the Internet 110. During the VoIP call session, voice/image signals are converted into RTP packets for transmission via the RTP server 103.

QoS is a major issue in VoIP implementations. The issue is how to guarantee that packet traffic for a voice or other media connection will not be delayed or dropped due to interference from other lower priority traffic. Conventionally, only one RTP server is selected for routing a VoIP call between the user endpoints. Usually, an RTP server that is geographically close to the caller endpoint is selected to achieve short transmission latency between the RTP server and the caller device. However, the selection is made without referring to the transmission performance between the RTP server and the receiver endpoint, which can be less than satisfactory. The imbalance of the transmission performance can still cause packet loss, jitter, packet re-sequencing, packet duplications, etc., and consequently cause noticeable low quality of call service. Moreover, a conventional VoIP system generally lacks any mechanism of selecting an optimal Internet path for routing a call.

SUMMARY OF THE INVENTION

Therefore, it would be advantageous to provide a system and method offering improved QoS of VoIP calls over Internet lines.

Embodiments of the present disclosure provide a VoIP system configured to select multiple Real-time Transport Protocol servers (RTP) for transmitting VoIP data (e.g., RTP packets) between multiple user endpoints during a VoIP call session. The RTP servers are selected based on the respective locations of user endpoints (e.g., a phone or a personal computer) according to the network topology. Traffic mirroring is established between the selected RTP servers. Each RTP server is responsible for transmitting the VoIP data representing the video/audio signals received at its associated endpoint to another RTP server which then relays the data to another endpoint. Further, routing optimization can be performed to select a network route between the selected RTP servers for data transmission. In one embodiment, a VoIP system according to the present disclosure is deployed on a software-defined network (SDN) which includes RTP servers and SIP servers in the application layer.

According to the present disclosure, because an RTP server is assigned for each endpoint based on their relative locations according to the network topology, the VoIP data transmission between the RTP server and its associated endpoint (RTP server-to-endpoint) can be optimized based on QoS requirements. This advantageously reduces or eliminates the imbalance of transmission quality caused by using a single RTP server for all the endpoints. In addition, a VoIP system according to the present disclosure is equipped to optimize the data transmission between the RTP servers (RTP server-to-RTP server) using a routing optimization process. As a result, the entire route from one user endpoint to another (endpoint-to-endpoint) is optimized, effectively enhancing the QoS during a VoIP call session.

In one embodiment of the present disclosure, a computer implemented method of providing VoIP communications over a network includes: identifying a first server based on the network address of a caller device in response to a request sent from the caller device for communicating with a callee device in real-time; and identifying a second server based on the network address of the callee device. The method further includes initiating transmission of data streams between said first server and said second server in a mirrored manner according to a Real-time Transport Protocol (RTP). The data streams represent voice and/or image signals detected at said caller device and said callee device.

The foregoing is a summary and thus contains, by necessity, simplifications, generalization and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

VoIP Routing Based on RTP Server-to-Server Routing

Overall, embodiments of the present disclosure employ a computer implemented process to select multiple Real-time Transport Protocol (RTP) servers for transmitting Voice over Internet Protocol (VoIP) data between user endpoints. Based on the location of each particular user endpoint, a respective RTP server is selected such that the transmission route between the RTP server and the particular endpoint offers superior transmission performance. A network route between RTP servers can be selected according to a routing optimization process. During a call session, each RTP server receives the VoIP data originated from its associated endpoint and forwards it to another RTP server in a mirrored fashion for delivery to another endpoint.

Figure 2:
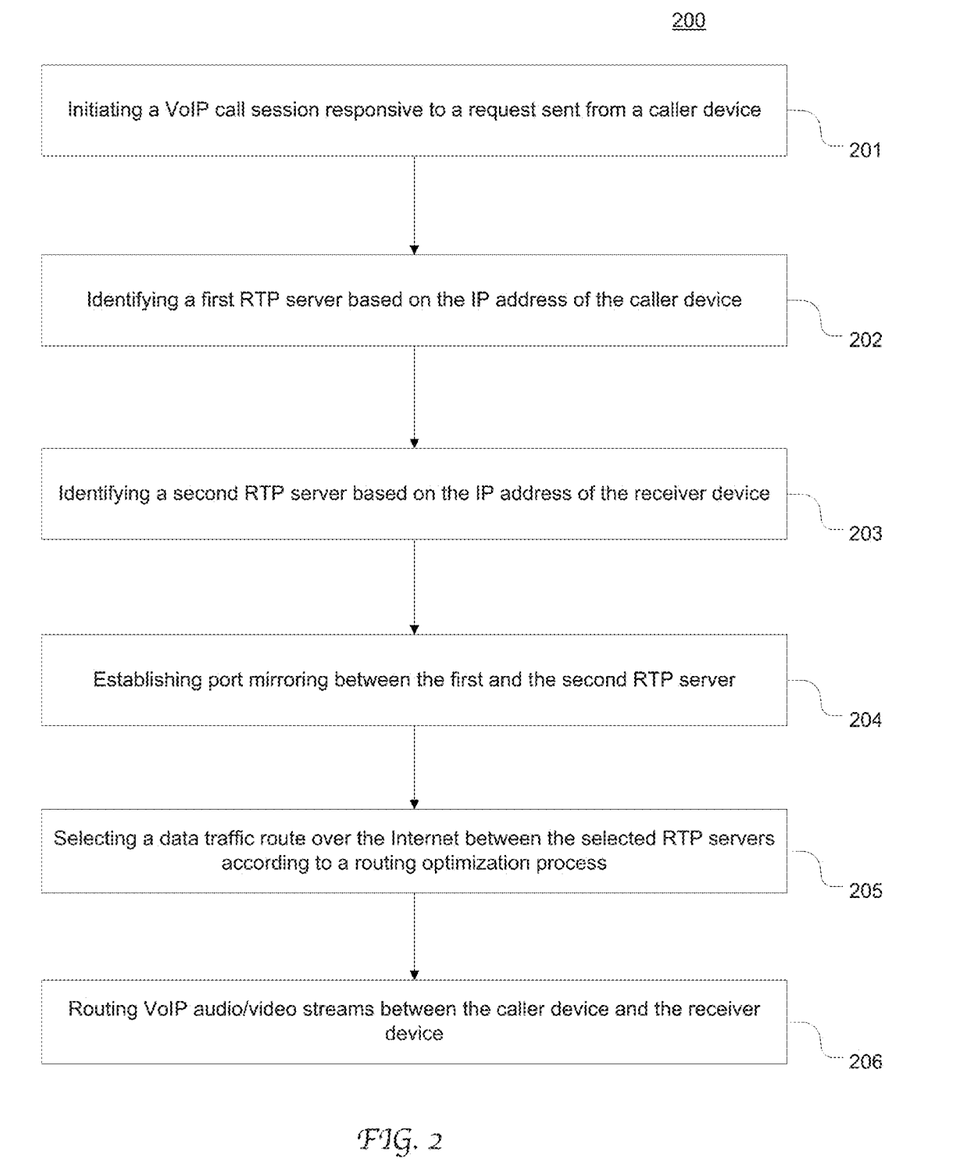
FIG. 2 is a flow chart depicting an exemplary computer implemented process of facilitating a VoIP call over a network according to an embodiment of the present disclosure.

FIG. 2 is a flow chart depicting an exemplary computer implemented process 200 of facilitating a VoIP call over a network according to an embodiment of the present disclosure. At 201, responsive to a call request, a VoIP communication session is initiated. For instance, the call request stems from a user dialing a call number on a caller device, and the call number is associated with a receiver device. At least one of the caller device and the receiver device is a VoIP subscribing user device, such as a smart phone, a wired phone, or a personal computer, etc. It will be appreciated that a subscribing user device may have a VoIP application program installed (e.g., a smart phone) or may be coupled to an adapter that is configured to convert a phone call to a VoIP call (e.g., a VoIP router or VoIP gateway). A Session Initiation Protocol (SIP) server of the network receives the call request and initiates a VoIP call session.

At 202, a first RTP server coupled to the network is identified based on the network address of the caller device. In some embodiments, the first RTP server is selected based on the location of the caller device specified in the network topology. For example, an RTP server that is geographically close to the caller device is selected to achieve a short transmission path. However, the first RTP server can also be selected according to various other criteria or metrics to ensure Quality of Service (QoS), such as customized QoS rules and policies set forth for VoIP call sessions.

At 203, a second RTP server is identified based on the dialed number and the IP address of the receiver device. By the same token, the second RTP server may be selected based on various criteria and metrics, such as customized QoS rules and policies set forth for VoIP call sessions. In some embodiments, the second RTP server is selected based on the address of the receiver device according to the network topology to achieve a short propagation delay. For example, an RTP server that is geographically close to the receiver device is selected to achieve a short transmission path and thus transmission latency. In some embodiments, the steps 202-203 are performed by the SIP server.

In some embodiments, RTP servers are effectuated and used for VoIP transmission only when a direct connection (or peer-to-peer connection) between the user endpoints is unavailable. In some other embodiments, RTP servers are used even when a direct connection is available because the network conditions through the RTP servers may be better. Still in some other embodiments, RTP serves are used regardless of the availability and/or performance of a direction connection.

At 204, real-time traffic mirroring is established between the first and the second RTP servers, particularly, between the respective RTP ports. At 205, a transmission path between the first and the second RTP servers is determined according to a routing optimization process, e.g., based on QoS requirements, rules, or policies, etc. It will be appreciated that the present disclosure is not limited to any specific technique, algorithm or criteria of network route optimization. The optimization can be based on the network topology and configuration parameters, traffic demands, and/or current load on the routers and links, etc. For example, a set of metrics can be used for evaluating a route selection in an optimization process, such as reachability, speed, load, latency, packet loss, stability, unreachable time, round trip time, reliability, link usage, throughput, cost, jitter and/or Mean Opinion Score (MOS). Various techniques of implementing routing optimization that are well known in the art can be used to practice the present disclosure.

At 206, the VoIP audio/video streams are routed between the user endpoints by network traffic mirroring of the RTP servers. More specifically, the VoIP data streams originated from the caller device (e.g., representing caller's voice and/or images) are transmitted to the first RTP server, typically, in the form of RTP packets. Upon receipt, the first RTP server forwards a copy of the received packets to the second RTP server via the selected network path between the RTP servers. The second RTP server then relays the RTP packets to the receiver device for playing-back, e.g., through a speaker and/or a display device. Likewise, the VoIP data stream originated from the receiver device (e.g., representing receiver's voice and/images) is transmitted to the second RTP server. Upon receiving the RTP packets, the second RTP server forwards a copy of the received RTP packets to the first RTP server which then relays the RTP packets to the caller device for play-back, e.g., through a speaker and/or a display device.

According to the present disclosure, because a respective RTP server is assigned for each endpoint based on their relative locations according to the network topology, the VoIP data transmission between the RTP server and each endpoint (RTP server-to-endpoint) can be optimized to meet QoS requirements. This advantageously reduces or eliminates the imbalance of transmission quality caused by using a single RTP server for multiple or all the endpoints as in the prior art. In addition, a VoIP system according to the present disclosure is equipped to optimize the data transmission between the RTP servers (RTP server-to-server) using a routing optimization process. As a result, a comprehensive optimized network route from one user endpoint to another (endpoint-to-endpoint) is achieved, effectively enhancing the QoS during a VoIP call session.

Figure 3:
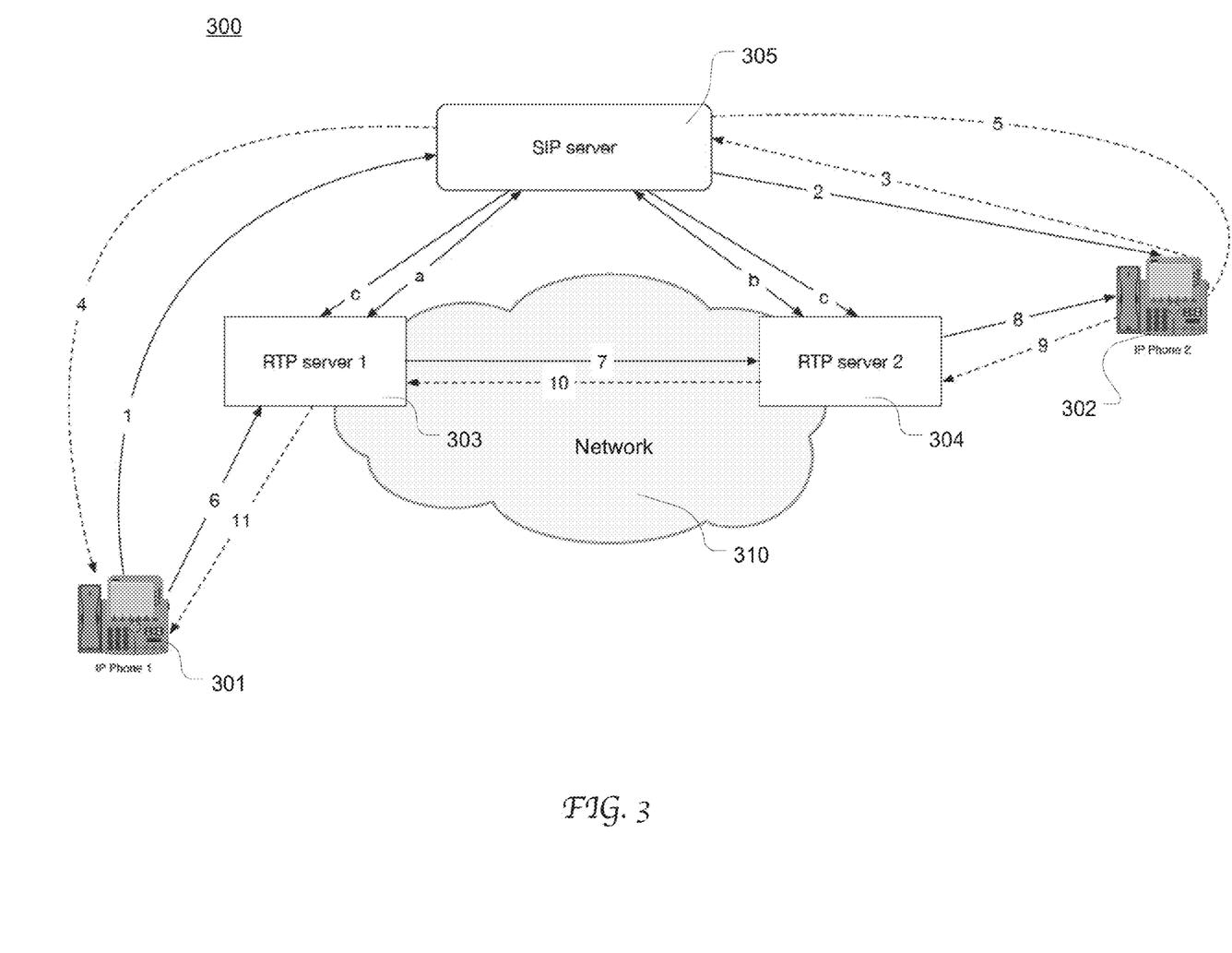
FIG. 3 illustrates an exemplary VoIP system configured to provide VoIP call service using multiple RTP servers that communicate with each other via traffic mirroring in accordance with an embodiment of the present disclosure.

FIG. 3 illustrates an exemplary VoIP system 300 configured to provide VoIP call services using multiple RTP servers that exchange VoIP data with each other via traffic mirroring in accordance with an embodiment of the present disclosure. The VoIP system 300 includes IP phones 301 and 302, an SIP server 305, and two RTP servers 303 and 304 selected for a particular VoIP call session, and the communication network 310. The RTP server 1 303 is assigned to receive VoIP data originated from the endpoint device 301 and then forward it to the RTP server 2 304 in a mirrored manner. The RTP server 2 304 is assigned to receive VoIP data originated from the endpoint device 302 and then forward it to the RTP server 1 303.

More specifically, once a user dials a phone number of the IP phone 1 301, a VoIP call request is generated at the IP phone 1 301 and sent to the SIP server 305 (the communication flow shown by arrow 1). The IP address of IP phone 1 and the phone number of the IP phone 2 302 are notified to the SIP server 305. Accordingly the SIP server 305 locates the IP phone 2 302 (shown by arrow 2), and the IP phone 2 informs its IP address to the SIP server 305 (shown by dashed arrow 3).

According to the present disclosure, the SIP server 305 has access to the network topology of the VoIP system 300. Thereby, the SIP server 305 selects the RTP server 1 303 based on the address of the IP phone 1 301 and inquires and obtains the identification of its available RTP port (shown by arrow a). Similarly, the SIP server 305 selects the RTP server 2 304 based on the address of the IP phone 2 302 and inquires and obtains the identification of its available RTP port (shown by arrow b). The SIP server 305 signals the RTP servers 303 and 304 to set up port mirroring between the two identified RTP ports (shown by arrow c). The SIP server 305 instructs IP phone 1 301 to associate with the RTP server 1 303 (shown by dashed arrow 4) and instructs IP phone 2 302 to associate with the RTP server 2 304 (shown by dashed arrow 5). A network route in the Internet 310 is determined for traffic mirroring between the identified RTP ports, e.g., according to routing calculation or optimization processes. Accordingly, the RTP servers 303 and 304 update their respective flow tables based on the selected network route.

As a result, a real-time communication channel is established between the endpoints 301 and 302. During the VoIP call session, the analog audio/video signals (e.g., representing the caller's voice/images) received at the IP phone 1 301 are converted into RTP packets for transmission. The IP phone 1 301 sends the RTP packets to the RTP server 1 303 (shown by arrows 6). Based on the updated flow table, the RTP server 1 303 forwards a copy of the RTP packets to the RTP server 2 304 via the selected network route (shown by arrows 7). The RTP server 2 304 then transmits the RTP packets to the IP phone 2 302, where the packets are reverted to analog voice/image signals and played back, e.g., through the speaker and/or the display panel (shown by arrow 8). The dashed arrows 9, 10 and 11 illustrate the VoIP packet flow in the reverse direction from the IP phone 2 302 to the IP phone 1 301. The conversion of analog video/audio signals to digital data, and vice versa, in various protocols can be performed in various suitable devices and processes that are well known in the art.

The network 310 may include wireless interfaces, wire interfaces, a local area network (LAN), and/or a wide area networks (WAN), and etc. The network 310 may include a software-defined network, a physical network, and/or a virtual network, etc.

Devices that may operate as VoIP user endpoint devices include personal computers, desktop computers, smart phones, Personal Digital Assistants (PDAs), handheld computers, programmable consumer electronics, standard telephones configured with an analog telephone adaptors (ATA), IP phones, or other mobile devices and alike.

It will be appreciated that a VoIP endpoint device may be coupled to the network and the RTP servers via one or more intermediary devices that are well known in the art, such as a VoIP gateway, a VoIP enabled router, network switches, a hub, a private automatic branch exchange (PABX), a fire wall, and/or a network address translation device, etc. Further, VoIP data transmission may employ RTP and SIP over the Transmission Control Protocol (TCP). In one embodiment, VoIP data that initially employs RTP and SIP over the user Datagram Protocol (UDP) are translated to use the TCP protocol.

Figure 4:
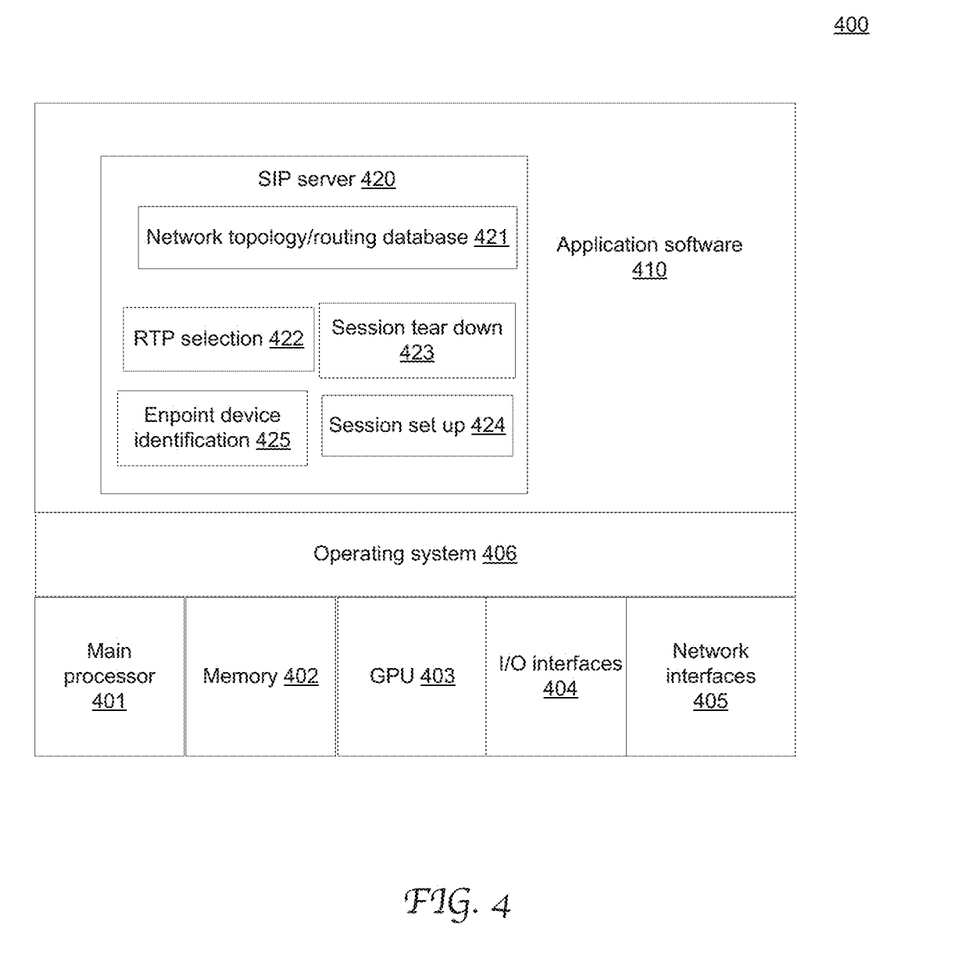
FIG. 4 illustrates a functional diagram of an exemplary SIP server device capable of managing a VoIP call session in which multiple RTP servers are used to route the VoIP data according to an embodiment of the present disclosure.

FIG. 4 is a block diagram illustrating the configuration of an exemplary SIP server device 400 capable of managing a VoIP call session in which multiple RTP servers are selected for routing the VoIP data according to an embodiment of the present disclosure. The SIP server device 400 includes a main processor 401, system memory 402, a graphics processing unit (GPU) 403, I/O interfaces 404 and network circuits 405, an operating system 406 and application software 410. The application software 410 includes the SIP server program 420 stored in the memory 402. When executed by the main processor 401, the SIP server program 420 can initiate a VoIP call session responsive to user requests and select appropriate RTP servers for respective endpoints based on network topology, traffic demands, and/or current load on routers and links, etc.

More specifically, the SIP server 420 program includes the network topology/routing database 421, a RTP selection 422 module, a session tear down module 423, a session setup module 424, and a user device identification module 425. The network topology/routing database 421 stores the information regarding the arrangement and statuses of various components and the physical and logical structure of the network used to provide the VoIP services. According to the addresses of multiple user endpoint devices and based on the information contained in the database 421, the RTP selection module 422 identifies suitable RTP servers for the endpoint devices, respectively. The selection may be based on a set of QoS metrics to achieve enhanced transmission performance between each particular endpoint device and its assigned RTP server. The set of metrics may be pertinent to latency, availability, jitter, and bandwidth, etc. The session setup module 424 functions to signal the selected RTP servers to establish port mirroring and initiate a VoIP call session. The session tear down module 423 functions to signal the RTP servers to end the port mirroring relationship once a phone call is ended. The user device identification module 425 identifies the endpoint devices participating in a call based on user requests. The SIP server program 420 may perform other various functions and processes as discussed in detail with reference to FIG. 2-3.

It will be appreciated that the SIP server 400 may include a wide range of other modules and functions that are well known in the art. Techniques for implementing these programmed modules are well known in the art. Moreover, a VoIP system according to the present disclosure may include one or more SIP server devices which may be configured as an SIP registar server, an SIP proxy server, or an SIP redirect server, respectively. An RTP selection function according to the present disclosure can be implemented in any type of these SIP servers. As will be appreciated by those with ordinary skill in the art, the SIP server program 420 can be implemented in any one or more suitable programming languages that are known to those skilled in the art, such as C, C++, Java, Python, Perl, C#, SQL, etc.

Figure 5:
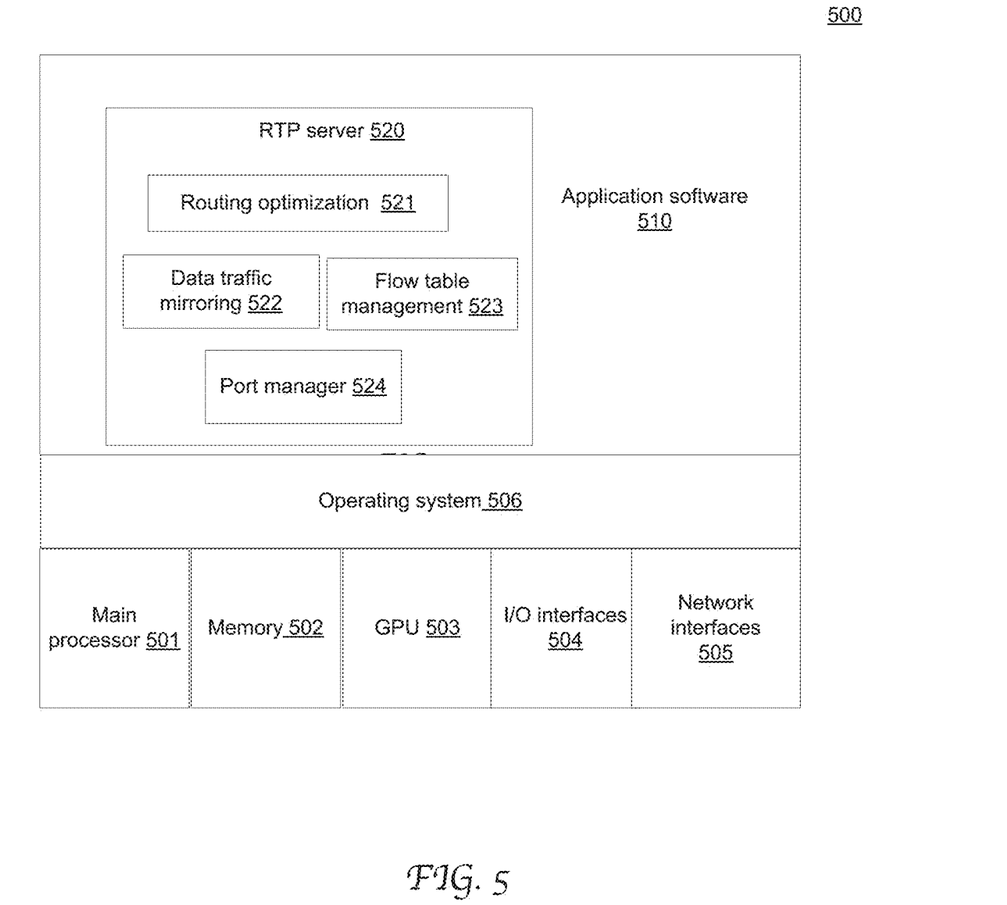
FIG. 5 illustrates a functional diagram of an exemplary RTP server device capable of routing VoIP data to another peer RTP server in a mirrored fashion according to an embodiment of the present disclosure.

FIG. 5 is a block diagram illustrating the configuration of an exemplary RTP server device 500 capable of routing VoIP data to a peer RTP server in a mirrored fashion according to an embodiment of the present disclosure. The RTP server device 500 includes a main processor 501, system memory 502, a graphics processing unit (GPU) 503, I/O interfaces 504 and network circuits 505, an operating system 506 and application software 510. The application software 510 includes the RTP server program 520 stored in the memory 502. When executed by the main processor 501, the RTP server program 520 can communicate with another RTP server to transmit VoIP data in accordance with an embodiment of the present disclosure.

The RTP server program 520 includes a routing optimization module 521, a data traffic mirroring module 522, a flow table management module 523, and a port manager 524. Upon the RTP server 520 being selected to participate in a VoIP call session, the routing optimization module 521 performs a routing optimization process to determine a network route for exchanging VoIP data with another selected RTP server, as described in greater detail above with reference to FIGS. 2-3. However, in some other embodiments, the route optimization functionalities are performed by another device in the VoIP system, e.g., an SIP server (as described in FIG. 4), or a SDN controller including a routing control program as described below.

The data traffic mirroring module 522 operates to exchange VoIP data with another RTP server in a mirrored manner, as described in greater detail above with reference to FIGS. 2-3. The flow table manager 523 is configured to update the flow table reflecting the selected route between the RTP server 520 and another selected RTP server. The port manager 524 maintains status information of the RTP ports associated with the RTP server 520 and communicates the information with the SIP server to identify an available port. The port manager also 524 operates to establish port mirroring with the identified port of another selected RTP port.

It will be appreciated that the RTP server 520 may include a wide range of other modules and functions that are well known in the art. For example, the RTP server 520 is also configured to play, record, store, and provide codec/encryption support of RTP packets. Techniques for implementing these programmed modules are well known in the art.

The present disclosure is not limited by the type or scale of a network used for transmitting VoIP data. The VoIP system may be deployed on a public network (or the Internet) or a private network designed to provide VoIP services, a wired network, a wireless network, an SDN, a virtual network, a physical network, or a combination thereof. Correspondingly, the caller and the receiver devices may be associated with respective public IP addresses or private network addresses, etc.

Figure 6:
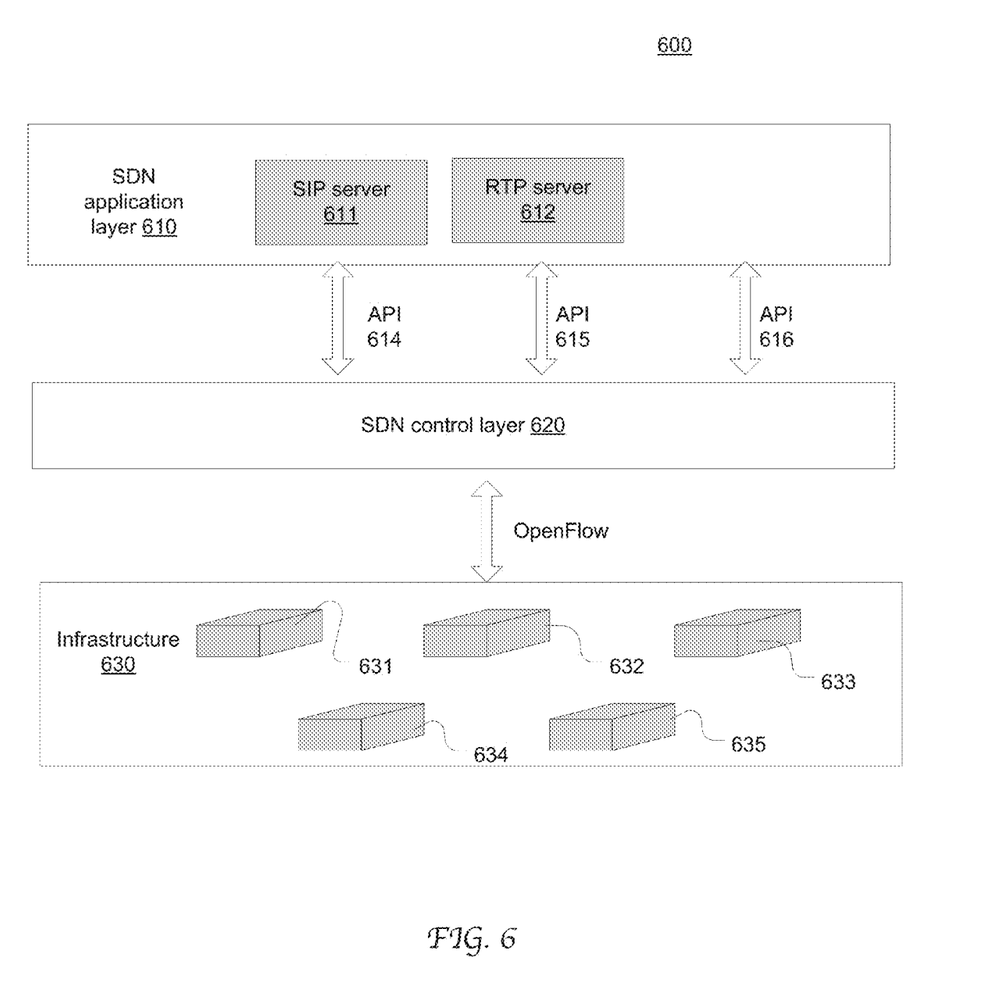
FIG. 6 illustrates an exemplary VoIP system deployed on an SDN in accordance with an embodiment of the present disclosure.

FIG. 6 illustrates an exemplary VoIP system 600 deployed on an SDN in accordance with an embodiment of the present disclosure. The SDN includes three logic layers, the application layer 660, the control layer 620, and the infrastructure layer 630. The control layer 620 serves as the interface between the application layer 610 and the infrastructure layer 630.

The infrastructure layer 630 includes the network hardware devices 631-635 coupled in the network, e.g., SDN switches or SDN routers. The control layer 620, or the SDN controller, can offer programming interfaces to network devices and management. The control layer 620 communicates with the network devices in the OpenFlow protocol. The control layer 620 may include one or more control software programs that implement a centralized or a distributed SDN control system.

In some embodiments where the SDN utilizes a distributed control system, each controller in the distributed control system includes an input interface, a route computation module, a message generation module, an output interface, a storage module and a network circuit. The input interface operates to receive route requests from a network device or other controllers within the network. The route computation module is configured to determine transmission paths, e.g., based on topology information of the network, in accordance with any suitable algorithm or routing model. The message generation module can generate a route response that identifies the computed route in accordance with any suitable format recognizable by the pertinent network devices. The output interface is configured to send the route response to a network device or other controllers. The storage module may store the topology information of the network that can be used for route computation. The network circuit can render network connection between the controller and the network devices in the network.

The application layer 610 includes an SIP server program 611, an RTP server program 612 and others (not shown) that can deliver network functions or services in software. In this example, the server programs 611 and 612 are used to provide VoIP audio and/or video services as described in detail with reference to FIGS. 2-5. Other application programs can be related to cloud functions, load balancing, business applications, network security, burst transmission, etc. The application layer 610 communicates with the control layer application program interfaces 614-616 corresponding to respective application programs.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of providing Voice over Internet Protocol (VoIP) communication over a network, said method comprising:
   at a Session Initiation Protocol (SIP) server, responsive to a request sent from a caller device for communicating with a callee device in real-time, identifying a first Real-time Transportation Protocol (RTP) server coupled to said network based on a network address associated with the caller device and further based on a geolocation of said caller device, wherein said SIP server comprises topology information of said network and a routing database, and wherein said topology information specifies said geolocation of said caller device;
   at said SIP server, responsive to said request, identifying a second RTP server coupled to said network based on a network address associated with the callee device and further based on a geolocation of said callee device and a Quality of Service (QoS) policy, wherein said topology information of said network in said SIP server specifies said qeolocation of said callee device; and
   at said SIP server, initiating transmission of data streams between said first RTP server and said second RTP server in a mirrored manner according to a Real-time Transport Protocol (RTP), wherein said data streams represent voice or image signals detected at said caller device and said callee device.

2. The computer implemented method of claim 1, wherein said network address associated with said callee device comprises an Internet Protocol address.

3. The computer implemented method of claim 1 further comprising, at said SIP server:

responsive to said request, identifying a first RTP server port associated with said first RTP server and a second RTP server port associated with said second RTP server; and
   instructing said first RTP server and said second RTP server to establish data mirroring communication through said first RTP server port and said second RTP server port.

4. The computer implemented method of claim 1, wherein said data streams comprise RTP packets.

5. The computer implemented method of claim 1, wherein said network comprises a software-defined network.

6. The computer implemented method of claim 1, wherein said first RTP server and said second RTP server are configured to select a transmission route in said network for said transmission of said data streams in accordance with a routing optimization process.

7. The computer implemented method of claim 1, wherein said transmission of said data streams comprises:
   forwarding a copy of first data packets received at said first RTP server to said second RTP server, wherein said first data packets represent voice/image signals detected at said caller device; and
   forwarding a copy of second data packets received at said second RTP server to said first RTP server, wherein said second data packets represent voice or image signals received at said callee device.

8. A non-transitory computer-readable storage medium embodying instructions that, when executed by a processing device, cause a Session Initiation Protocol (SIP) server to perform a method of facilitating Voice over Internet Protocol (VoIP) communication over a network according to a Session Initiation Protocol (SIP), said method comprising:
   at said SIP server, maintaining topology information of said network and a routing database;
   at said SIP server, responsive to a request sent from a caller device for communicating with a callee device in real-time, identifying a first RTP server coupled to said network based on: an Internet Protocol (IP) address associated with the caller device; a geolocation of said caller device; and a Quality of Service (QoS) policy;
   at said SIP server, responsive to said request, identifying a second RTP server coupled to said network based on an Internet Protocol (IP) address associated with the callee device and further based on: a geolocation of said callee device; and a Quality of Service (QoS) policy; and
   at said SIP server, initiating transmission of data streams between said first RTP server and said second RTP server in a mirrored manner according to a Real-time Transportation Protocol (RTP), wherein said data streams represent a conversation between users of said caller device and said callee device, wherein said topology information maintained at said SIP server specifies said geolocation of said caller device and said geolocation of said callee device.

9. The non-transitory computer-readable storage medium of claim 8, wherein said method further comprises:
   at said SIP server, responsive to said request, identifying a first RTP server port associated with said first RTP server and a second RTP server port associated with said second RTP server; and
   at said SIP server, instructing to establish data mirroring communication between said first RTP server port and said second RTP server port.

10. The non-transitory computer-readable storage medium of claim 8, wherein said data streams comprise VoIP packets representing audio content or a mix of audio and video content.

11. The non-transitory computer-readable storage medium of claim 8, wherein said network comprises a software-defined network.

12. The non-transitory computer-readable storage medium of claim 8, wherein said first RTP server and said second RTP server are operable to select a transmission route in said network for said transmission of said data streams in accordance with a routing optimization process.

13. The non-transitory computer-readable storage medium of claim 8, wherein said transmission of data stream comprises:
  forwarding a copy of first data packets received at said first RTP server to said second RTP server, wherein said first data packets represent said conversation received at said caller device; and
  forwarding a copy of second data packets received at said second RTP server to said first RTP server wherein said second data packets represent said conversation received at said caller device.

14. A non-transitory computer-readable storage medium embodying instructions that, when executed by a processing device, cause a Real-time Transport Protocol(RTP) server to perform a method of facilitating Voice over Internet Protocol (VoIP) communication via a network, said method comprising:
  at said RTP server, receiving an instruction from a Session Initiation Protocol (SIP) server to establish traffic mirroring with another RTP server device;
  at said RTP sewer, selecting a route for transmission of said first packets and said second packets between said RTP server device and said another RTP server device by a routing optimization process;
  at said RTP server, receiving first data packets transmitted from a caller device, wherein said first data packet represent voice/image signals detected at a caller device;
  at said RTP server, forwarding said first data packets to said another RTP server device;
  at said RTP server, receiving second data packets forwarded from said another RTP server device, wherein said second packets represent voice/image signals received at a callee device; and
  at said RTP server, transmitting said second VoIP packets to said caller device for play-back,
  wherein said RTP server and said another RTP server device are selected by said SIP server in response to a request sent from a caller device for a VoIP communication with a callee device and based on respective geolocations of said caller device and said callee device, wherein said SIP server comprises network topology that specifies said geolocations.

15. The non-transitory computer-readable storage medium of claim 14, wherein said network comprises a software-defined network.

16. The non-transitory computer-readable storage medium of claim 14, wherein said routing optimization process is based on said network topology, traffic demands, and/or current load on routers and links of said network.

17. The non-transitory computer-readable storage medium of claim 14, wherein said caller device and said callee device are respectively selected from a group consisting of a personal computer, a mobile phone, a smart phone, and a Public Switched Telephone Network (PSTN) phone.

* * * * *